United States Patent [19]

Staufenberg, Jr et al.

[11] Patent Number: 4,831,306
[45] Date of Patent: May 16, 1989

[54] PIEZOELECTRIC MOTOR HAVING A PIVOTALLY MOUNTED ANNULAR SHAPED HOUSING

[75] Inventors: Charles W. Staufenberg, Jr; Robert J. Hubbell, both of Santa Barbara, Calif.

[73] Assignee: Micro-Pulse Research and Development, Santa Barbara, Calif.

[21] Appl. No.: 190,021

[22] Filed: May 4, 1988

[51] Int. Cl.[4] ............................................. H01L 41/08
[52] U.S. Cl. ..................................... 310/328; 310/323
[58] Field of Search ................................ 310/323, 328

[56] References Cited

U.S. PATENT DOCUMENTS

| 4,400,641 | 8/1983 | Vishneusky et al. | 310/328 X |
| 4,634,915 | 1/1987 | Mukoujima et al. | 310/323 |

FOREIGN PATENT DOCUMENTS

| 0172981 | 9/1984 | Japan | 310/328 |
| 0624320 | 9/1978 | U.S.S.R. | 310/328 |

Primary Examiner—Mark O. Budd

[57] ABSTRACT

A piezoelectric motor for rotating a shaft formed of a hard material and having a general circular cross-section which drives a load having preselected torque characteristics and a known frictional force which opposes rotation of the shaft and load is shown. The piezoelectric motor includes a piezoelectric translation apparatus which is operatively coupled to the shaft for producing incremental angular rotation thereof. The piezoelectric translation apparatus includes a base plate, an annular-shaped housing and a support pin which passes through an aperture in the housing enabling the support pin to pivotally attach the housing onto the base plate. The piezoelectric translation apparatus further includes a piezoelectric driver assembly having an engaging member, at least one piezoelectric driving element and a compliance means. A control circuit for selectively applying electrical signals to the piezoelectric driving element for expanding and contracting the same is shown. The piezoelectric driving element is responsive the electric signals for applying a driving force on the shaft through the engaging member wherein the driving force applied to the shaft is reacted to the housing against the restoring force applied on the housing by the compliance means.

6 Claims, 1 Drawing Sheet

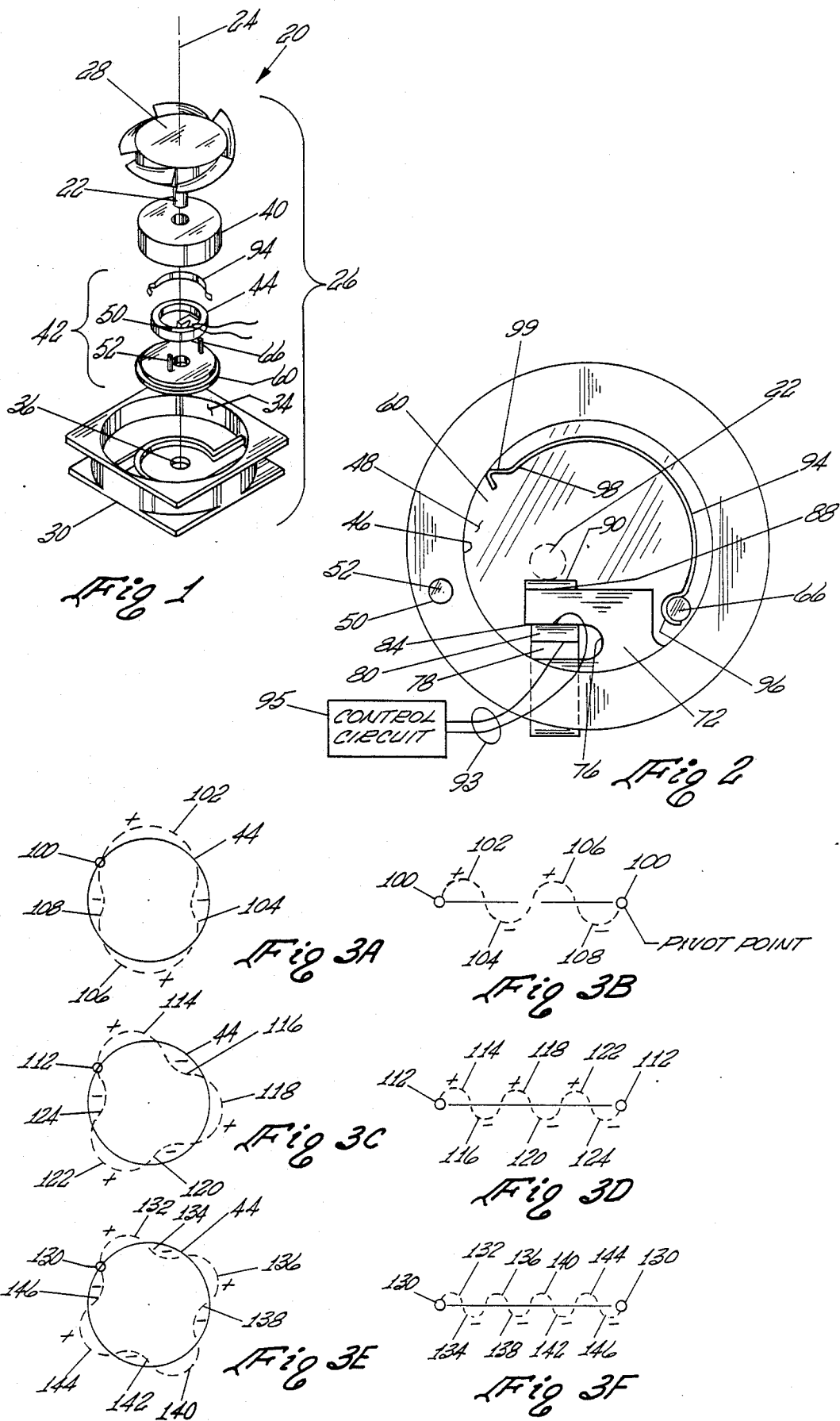

PIEZOELECTRIC MOTOR HAVING A PIVOTALLY MOUNTED ANNULAR SHAPED HOUSING

BACKGROUND OF THE INVENTION

1. Field of Invention

This invention relates to an electromechanical piezoelectric translation apparatus and, more particularly, to a piezoelectric motor for rotating a shaft formed of hard material which drives a load having a preselected load characteristic and a known friction force which opposes rotation of the shaft and load. The piezoelectric motor includes an annular shaped housing which pivots about a support pin under a clamping force developed by a compliance means to maintain driving contact between the piezoelectric translation apparatus and the shaft.

2. Description of the Prior Art

The concept of a piezoelectric motor or electromechanical device to produce rotational or linear relative movement between an electromechanical device and a driven member is known in the art.

The most pertinent prior art is disclosed is U.S. Pat. No. 4,622,483 entitled PIEZOELECTRIC ELECTROMECHANICAL TRANSLATION APPARATUS AND METHOD and U.S. Pat. No. 4,727,728 entitled PIEZOELECTRIC MULTIAXIS MICROPOSITIONER, both of which have the same inventors as this Application.

U.S. Pat. No. 4,622,483 discloses an electromechanical translation apparatus which is adapted to produce incremental movement relative to a separate member wherein that movement can either be a linear movement or a rotational movement. The electromechanical translation apparatus disclosed in U.S. Pat. No. 4,622,483 includes a housing, a pair of clamping and translating members each of which has driven end and engaging ends wherein each of the engaging ends is adapted to removably clamp and translate separate member relative the housing in response to a driving force which is selectively applied to the clamping and translating members. The engaging ends of the clamping and translating members selectively clamp the separate member at selected locations with a clamping force developed from a compliance means and which varies with the magnitude of the driving force. The electromechanical translation apparatus disclosed in U.S. Pat. No. 4,622,483 includes at least at least one piezoelectric driving element which is operatively coupled to the clamping and translating member. The piezoelectric driving element is capable of being selectively expanded and contracted in a response to a voltage of a selected magnitude and selected frequency. The expansion and contraction of the piezoelectric element produces, between the housing and the clamping and translating members, a variable driving force which varies between a first magnitude and a second magnitude and which enables the engaging ends of the clamping and translating members to apply a variable clamping force to the separate member. A method for producing relative transactional movement between an electromechanical apparatus and a separate member is also disclosed in U.S. Pat. No. 4,622,483. FIGS. 35 and 36 of U.S. Pat. No. 4,622,483 illustrate embodiment of piezoelectric translation apparatus wherein a radially extending housing supports a piezoelectric driving element against a shaft to rotate the same.

U.S. Pat. No. 4,727,278 discloses an electromechanical translation apparatus which is in the form of a piezoelectric multiaxis micropositioner. The apparatus disclosed in U.S. Pat. No. 4,727,278 includes a driven member which is adapted to be incrementally moved in a selected direction, which could be along an "X" axis, along an "XY" axis or "XYZ" axis or in a selected clockwise or counter clockwise direction about a selected axis. The piezoelectric multiaxis micropositioner includes a mounting means, at least three piezoelectric driving assemblies having a housing and an engaging member formed of a hard material having a selected driving end at one end thereof and a driven end at the other end. The engaging member at one end is positioned to selectively engage and translate the driven member in response to a driving force. The piezoelectric multiaxis positioner includes at least three piezoelectric driving elements positioned between a driven end of the engaging member and the housing and wherein the piezoelectric driving elements are positioned in a spaced, angular relationship to each other. Each piezoelectric driving element is capable of separately responding to an electrical signal having a predetermined frequency and amplitude which varies between first polarity and a second polarity to expand and contract to change the geometric dimension of the piezoelectric driving element to apply a driving force on an engaging member. The engaging member imparts an incremental motion to the driven member in a selected direction. The preferred embodiment of the piezoelectric multiaxis positioner disclosed in U.S. Pat. No. 4,727,278, is to incrementally rotate a sphere having an optical element attached thereto for use in optical paths.

Other known piezoelectric electromechanical devices for producing incremental movement are described in U.S. Pat. Nos. 3,138,749; 3,217,218; 3,292,019; 3,377,489; 3,649,856; 3,684,904; 3,902,084; 3,902,085; 4,408,832; 4,422,002; 4,455,501; 4,468,583; and 4,523,120.

SUMMARY OF THE INVENTION

The present invention relates to a novel and unique piezoelectric motor which rotates a shaft formed of a hard material. The shaft has a generally circular cross-section and drives a load having preselected torque characteristics and a known friction force which opposes rotation of the shaft and load. The piezoelectric motor includes a piezoelectric translation apparatus which is operatively coupled to the shaft to produce incremental angular rotation thereof in a selected direction, clockwise or counter clockwise, about its elongated axis. The piezoelectric translation apparatus includes a base plate in which the shaft is journaled. An annular-shaped housing is provided which has an interior area through which the shaft passes so as to be substantially parallel to the axis of the housing. The housing includes a support aperture which is formed in the housing at a selected location. A support pin is provided which passes through aperture in the housing to permit the housing to pivot therearound. The support pin has one end thereof attached to the base plate enabling the support pin to pivotally attach the housing onto the base plate. An engaging member is provided, formed of a hard material, which has a driving end at one end thereof and a driven end formed on the end opposite the driving end. The one end of the engaging member is capable of selectively engaging and incrementally angularly rotating the shaft and load. At least one piezoelectric driving element is positioned in the interior area of the housing and operatively coupled between the housing and the driven end of the engaging member. The piezoelectric driving element is capable of responding to an applied electrical signal having a predetermined frequency and an amplitude which varies between a first polarity and a second polarity to expand and contract its geometric dimensions. The piezoelectric driving element is responsive to an electrical signal having an amplitude of a first polarity to urge the engaging member into driving engagement with the shaft to apply a driving force thereto to rotate the same in a selected direction and is responsive to an electrical signal having an amplitude of the second polarity t withdraw the engaging element from driving engagement with the shaft. A compliance means is operatively attached between the base plate and the housing for applying a restoring force between the housing and support pin for urging the engaging member into contact with the shaft wherein a tangential frictional force is developed between the engaging member and shaft which is greater than the known friction force which opposes rotation of the shaft and load. Means are provided which are operatively coupled to the at least one piezoelectric driving element for selectively applying an electrical signal to the at least piezoelectric driving element for expanding and contracting the same. The piezoelectric driving element is responsive to the electrical signal for applying a plurality of driving force pulses or a driving force on the shaft through the engaging member. The driving force applied to the shaft is reacted through the housing against the restoring force applied on the housing by the compliance means.

The piezoelectric electromechanical translation apparatus and method and piezoelectric multiaxis micropositioner disclosed in U.S. Pat. Nos. 4,622,483 and 4,727,728, respectively, have very broad and generic applications. The piezoelectric motor of the present invention represents an improvement of the teachings disclosed in the above-referenced U.S. Letters Pat. Nos. 4,622,483 and 4,727,7Z8 for the following reasons:

The piezoelectric motor described herein is a specially designed motor which is adapted to incrementally angularly rotate a driven member about its elongated axis at approximately 1500 rpm. The specific application disclosed herein is for the use of driving a fan load which has utility for various applications in air cooling of equipment such as, for example, an air moving fan utilized in a computer console, computer printer or the like.

One advantage of the present invention is that the piezoelectric motor can be fabricated with piezoelectric translation apparatus having one piezoelectric driver assembly which may have one or two piezoelectric driving elements. This results in a piezoelectric motor which is easy to manufacture and assemble resulting in a low cost device.

Another advantage of the present invention is that the piezoelectric motor can be used to drive any fan type load or other load exhibiting substantially the same loading characteristics as the fan. The device to be driven is operatively coupled to a shaft having a generally circular cross-section and which is driven by the piezoelectric motor.

Another advantage of the present invention is that the housing can be annular shaped and can be fabricated from a ceramic material, aluminum or a variety of metals or other hard materials.

Another advantage of the present invention is that the engaging member can be fabricated from a ceramic material or a metallic material. Depending upon the conductivity of the material used for the engaging member, conducting electrodes may be required to be positioned between the driven end of the engaging member and the piezoelectric driver element.

Another advantage of the present invention is that the piezoelectric motor is capable of producing angular incremental rotation of a shaft having a generally circular cross-section along its axis in a selected one of a clockwise direction or a counter clockwise direction.

Another advantage of the present invention is that the piezoelectric driver assembly of the piezoelectric translation apparatus can include two piezoelectric driving elements so as to select the desired direction of rotation. In this embodiment, the engaging member has a driving end and a driven end. The driven end is capable of being driven by two piezoelectric driving elements positioned in a predetermined spaced relationship to each other and which are operatively attached between the driven end and the housing.

Another advantage of the present invention is that the housing can be selected of material and dimensions to have a selected periodic or harmonic vibration, such as, for example, four modes ("4 Modes"), six modes ("6 Modes") or eight modes ("8 Modes") of vibration. The location of the support pin relative the housing is selected to be a location which represents a nodal point of the vibrational mode (e.g. 4 Mode; 6 Mode; or 8 Mode) of the annular-shaped housing.

Another advantage of the present invention is that an integrated compact fan assembly is provided having a pivotally mounted piezoelectric motor which is capable of rotating a fan member having a 2 inch, 5 bladed fan at about 1500 rpm. BRIEF DESCRIPTION OF THE DRAWINGS These and other advantages of the invention, together with its various features, would become apparent from the following detailed description of the preferred embodiment when taken in conjunction with the drawing which contain the following Figures:

FIG. 1 is perspective exploded assembly view of a piezoelectric motor of the present invention adapted for driving a five bladed fan;

FIG. 2 is a top plan view of a piezoelectric motor showing an annular-shaped housing, piezoelectric translation assembly having a one piezoelectric driving element and a compliance means;

FIGS. 3(A.) and 3(B) illustrate a housing formed from a metallic ring having a 4 Mode vibration and a waveform representing the frequency of vibration about the pivot point, respectively;

FIGS. 3(C) and 3(D) illustrate a housing formed from a metallic ring having a 6 Mode vibration and a waveform representing the frequency of vibration about the pivot point, respectively; and FIGS. 3(E) and 3(F) and illustrate a housing formed from a metallic ring having an 8 Mode vibration and a waveform representing the frequency of vibration about the pivot point, respectively.

DESCRIPTION OF THE PREFERRED EMBODIMENT

FIG. 1 illustrates pictorially a perspective exploded assembly view of a piezoelectric motor identified generally as 20. The piezoelectric motor 20 includes a shaft formed of a hard material and having a generally circular cross-section shown generally as 22. The shaft 22 is adapted to be incrementally angularly rotated in a selected direction, e.g., a clockwise or counter clockwise direction, about its elongated axis shown as dashed line 24. In the preferred embodiment, the shaft 22 is operatively coupled to drive fan load 28 having a preselected torque characteristic. The shaft 22 and fan load 28 in their bearings have a known friction force which opposes rotation of the shaft and load.

In FIGS. 1 and 2 the piezoelectric motor 20 includes a piezoelectric translation apparatus shown generally as 26 which is used to produce incremental angular rotation of the shaft 22 in the selected direction about the elongated axis 24. The piezoelectric translation apparatus 26 includes a base 30 which has a recessed area 34. The base 30 includes appropriate bearing means located at aperture 36 to journal the shaft 22 for rotation therein. The base 30 is positioned in a spaced relationship from and supports the shaft 22. The piezoelectric translation apparatus 26 is generally located within the recessed area 34 and the cover 40, which may also include a bearing to journal and pass the shaft 22.

The piezoelectric translation apparatus 26 includes a piezoelectric driver assembly, shown generally as 42. The piezoelectric driver assembly 42 is positioned in the area 34 in the base 30. As a result, the piezoelectric driver assembly 42 is located substantially within the recessed area 34 of the base 30 and is covered by cover 40.

The piezoelectric translation apparatus 26 includes an annular-shaped housing 44. The annular-shaped housing 44 can be made of a conductive or dielectric (nonconductive) material. In the preferred embodiment, a metal can be used, such as for example, 6061-T6 aluminum. Alternatively, the annular shaped housing can be formed from a ceramic material, such as for example 97% aluminum. The housing 44 includes an interior area, shown generally as 48. The housing 44 also includes an aperture, shown as 50, which is formed therethrough at a selected location. In the preferred embodiment, the selected location of the aperture is a function of the vibration mode characteristics of the annular shaped housing, as will be discussed further in connection with FIG. 3(A) through FIG. 3(F). Generally, the preferred location for the aperture is at a nodal point of the vibrations so as to permit the housing 44 to pivot about support pin 52 which, in the preferred embodiment, is mounted onto a base plate 60.

The support pin 52 passes through aperture 50 located in the housing 44 and is substantially parallel to the axis of the housing. The support pin 52 has one end thereof rigidly mounted to the base plate 60. This structure enables the housing 44 to be pivotally moved relative to the shaft to urge the engaging member into a driving relationship with the shaft 22.

A support member 66 is attached to the base plate 60. The support member 62 extends into the space of the recessed area 34 and, in turn, terminates at a location within the interior area 48 of the housing 44.

The piezoelectric driver assembly includes an engaging member, shown generally as 72, having a "U" shaped slot, shown generally as 76, formed therein, which is adapted to receive the piezoelectric driving elements 78 and 80 The engaging member 72 has a driven end 84 and a driving end 88. The driving end 88, in the embodiment illustrated in FIG. 2, may be laminated with a hard material 90 which is adapted to engage and drive the shaft 22. The shaft 22 extends into and through the interior area 48 of housing 40 and along a path which is substantially parallel to the axis of the housing 48. In the embodiment of FIG. 2, the housing 44 is formed of aluminum and the engaging member 72 is integral with the housing, and has a laminated driving end formed of tungsten carbide.

A compliance means, which in the embodiment in FIG. 2 is a semi-circular or arcuate shaped leaf spring 94, has a support end 96 and a free end 98. The compliance means may be a leaf spring, a coil spring or other resilient means or could be gravity. By selecting the appropriate pivot point in the housing 44, the center of gravity of the piezoelectric translation apparatus can be shifted in a direction to maintain contact between the engaging member and the shaft by developing a moment force about the pivot point. In the preferred embodiment, the compliance means is the arcuate shaped leaf spring 94, which has a support end 96 attached to the support member 66. The leaf spring 94 utilizes the support member 66 as a means for reacting the spring force developed thereby through the housing 44. The free end 96 includes a "V" shaped sliding member 99 which is adapted to slidably engage the inner wall 46 of the housing 44. When the engaging member 72 in the embodiment of FIG. 2 is responsive to the expansion of the piezoelectric driving elements 78 and 80, the laminated surface 90 engages and drives the shaft 22. The compliance means causes the housing 44 to pivot in a direction about support pin 52 in a direction to maintain the engaging member 72 in contact with the shaft 22. In summary, the compliance means is operatively attached between the base plate 60 and the housing 44 for applying a restoring force between the housing 44 and the support pin 52 and for engaging the engaging member 72 into contact with the shaft wherein a tangential frictional force is developed between the engaging member 72 and shaft 22 which is greater than the known friction force which opposes rotation of the shaft load.

Leads 93 extend from the piezoelectric crystals 78 and 80 to a control circuit 95. The control circuit 95 is a means for selectively applying electrical signals to the piezoelectric driving element for expanding and contracting the same.

FIGS. 3(A) through 3(F) disclose, conceptually, the vibrational modes of the annular-shaped housing 44 produced by the engaging member 72 driving the shaft 22. FIG. 3(A) shows that the housing 44 shown by the solid circle is driven into a 4 Mode vibration. The 4 Mode vibration is illustrated in FIG. 3(A) by the dashed line having deflection points 102, 104, 106 and 108. The pivot point or selected location of the support pin is shown by pivot point 100. FIG. 3(B) illustrates pictorially the positive (+) and negative (−) deflection or vibration cycles established in housing 44. As illustrated in FIG. 3(B), beginning at the pivot point 100, the first excursion 102 is positive for a ½ cycle, then goes negative as shown by waveform portion 104, then positive as shown by waveform portion 106 and negative as shown by waveform portion 108, back to the pivot point 100. The physical deformation or vibration of housing 44 shown by numerals 102, 104, 106 and 108 in FIG. 3(A) correspond with the waveform representation shown in FIG. 3(B).

FIG. 3(C) shows that the housing 44 shown by the solid circle is driven into a 6 Mode vibration. The 6 Mode vibration is illustrated in FIG. 3(C) by the dashed line having deflection points 114, 116, 118, 120, 122 and 124. The pivot point or selected location of the support pin is shown by pivot point 112. FIG. 3(D) illustrates pictorially the positive (+) and negative (−) deflections or vibration cycles established in housing 44. As illustrated in FIG. 3(D), beginning at the pivot point 112, the first excursion 112 is positive for ½ cycle, then goes negative as shown by waveform portion 114, then positive as shown by waveform portion 116 and then negative as shown by waveform portion 120, through an additional positive excursion 122 and negative excursion 124, and back to the pivot point 112. The physical deformations or vibrations of housing 44 shown by numerals 112, 114, 116, 118, 120 and 124 in FIG. 3(C) correspond with the waveform representation shown in FIG. 3(D).

FIG. 3(E) shows that the housing 44 shown by the solid circle is driven into an 8 Mode vibration. The 8 Mode vibration is illustrated in FIG. 3(F) by the dashed line having deflection points 132, 134, 136, 138, 140, 142, 144 and 146. The pivot point or selected location of the support pin is shown by pivot point 130. FIG. 3(F) illustrates pictorially the positive (+) and negative (−) deflections or vibration cycles established in housing 44. As illustrated in FIG. 3(F), beginning at the point 130, the first excursion 132 is positive for a ½ cycle, and goes negative as shown by waveform 134. The housing goes through an additional positive (+) and negative (−) excursion as shown by waveform portion 136, 138, 140, 144 and 146, back to the pivot point 130. The physical deformations or vibrations of housing 44 shown by numerals 132, 134, 136, 138, 140, 142, 144 and 146 in FIG. 3(E) correspond with the waveform representations shown in FIG. 3(F).

In the embodiment of FIG. 2, 8 Mode vibration occurs at approximately 124 KHZ and; the control circuit provides approximately 100 VRMS at this frequency. At higher frequencies (e.g. about 100 KHZ to about 200 KHZ) more mechanical energy is generated within the housing. Also, the illustrations shown in FIGS. 3(A) through 3(F) are representations of the device being driven with the electrical signal at one polarity which is a half cycle. The other portion of the electrical signal, or other half cycle, would be of an opposite polarity, and the representation would be reversed by 180°. Also, the mechanical vibrations are 90° out of phase with the electrical signal at the resonant frequency.

The preferred application for the pivotally mounted piezoelectric motor is in an integrated fan assembly for driving a fan load at about 1500 rpm. However, it is envisioned that the piezoelectric motor, or the piezoelectric translation apparatus as a separate assembly, has utility for driving other rotational devices. For example, the rotating motion could drive a rotary load through a gear reduction, such as for example, a rotating position device. Further, the electrical driving means could be used as an open loop drive system, without a servo system, or could be used as a closed loop drive system with a servo system.

What is claimed is:

1. A piezoelectric motor for rotating a shaft formed of a hard material and having a generally circular cross-section which drives a load having preselected torque characteristics and a known friction force which opposes rotation of the shaft and load comprising
    a piezoelectric translation apparatus operatively coupled to said shaft for producing incremental angular rotation thereof, said piezoelectric translation apparatus including
    a base plate in which said shaft is journaled;
    an annular-shaped housing having an interior area which passes said shaft along a path which is substantially parallel to the axis of the housing, said housing further including a support aperture formed in the housing at a selected location;
    a support pin passing through the aperture in said housing, said support pin having one end thereof attached to the base plate enabling the support pin to pivotally attach said housing onto said base plate;
    a piezoelectric driver assembly operatively attached to said housing and having
    an engaging member having a driving end at one end thereof formed of a hard material and a driven end formed on the end opposite to said driving end, said one end of the engaging member being capable of selectively engaging and incrementally angularly rotating said shaft and load;
    at least one piezoelectric driving element positioned in the interior area of said housing and operatively coupled to said housing and said driven end of said engaging member, said at least one piezoelectric driving element being capable of responding to an applied electrical signal having a predetermined frequency and an amplitude which varies between a first polarity and a second polarity to expand and contract to change its geometrical dimensions, said at least one piezoelectric driving element being responsive to an electrical signal having an amplitude of a first polarity to urge the engaging member into a driving engagement with said shaft to apply a driving force thereto to rotate the same in a selected direction and being responsive to an electrical signal having an amplitude of a second polarity to withdraw the engaging element from driving engagement with said shaft;
    a compliance means operatively attached between said base plate and said housing for applying a restoring force between said housing and support pin and for urging the engaging member into contact with the shaft wherein a tangential friction force is developed between the engaging member and shaft which is greater than the known friction force which opposes rotation of the shaft and load; and
    means operatively coupled to said at least one piezoelectric driving element for selectively applying electrical signals to said at least one piezoelectric driving element for expanding and contracting the same;
said at least one piezoelectric driving element being responsive to said electrical signals for applying a driving force on said shaft through said engaging member wherein the driving force applied to the shaft is reacted through the housing against the restoring force applied on said housing by said compliance means.

2. The piezoelectric motor of claim 1 wherein said shaft is operatively coupled to a rotatable fan load.

3. The piezoelectric motor of claim 1 wherein said piezoelectric driving element is capable of responding to an electrical signal to produce angular incremental rotation of said shaft and in a selected one of a clockwise direction and counterclockwise direction.

4. The piezoelectric motor of claim 1 wherein the driven end of said engaging member has two piezoelectric driving elements positioned in a predetermined spaced relationship to each other and which are operatively attached to said driven end and said housing.

5. The piezoelectric motor of claim 1 wherein the driving end of said engaging member is laminated with a different hard material which is adapted to engage and drive said shaft and load.

6. The piezoelectric motor of claim 2 wherein said compliance means is an arcuate shaped leaf spring.

* * * * *